United States Patent [19]

Yonezawa et al.

[11] 4,449,907

[45] May 22, 1984

[54] DIES EXCHANGING DEVICE FOR A MACHINE USING DIES

[75] Inventors: Keitaro Yonezawa, Itamishi; Tadao Utsumi, Aichiken, both of Japan

[73] Assignee: Aioi Seiki Kabushiki Kaisha, Japan

[21] Appl. No.: 512,663

[22] Filed: Jul. 11, 1983

[30] Foreign Application Priority Data

Feb. 4, 1982 [JP] Japan .................................. 57-14808

[51] Int. Cl.³ ............................................. B29F 1/00
[52] U.S. Cl. ................................................. 425/183
[58] Field of Search ............................. 425/34 R, 183

[56] References Cited

U.S. PATENT DOCUMENTS 3,746,487 7/1973 Andrews ......................... 425/183 X
4,325,685 4/1982 Lupke et al. ........................ 425/183

Primary Examiner—J. Howard Flint, Jr.
Attorney, Agent, or Firm—Bacon & Thomas

[57] ABSTRACT

A device for exchanging dies for a machine using dies is disclosed, wherein a pair of carriage cars are adapted to be movable in front of a die mounting space between a stationary plate and a movable plate of the machine to which the dies are clamped, transfer means for exchanging the dies between the die mounting space and the carriage car are provided, a main unit of a push-pull device is provided in front of the carriage car independently thereof so that the dies can be changed by this push-pull device between the carriage car and the die mounting space.

7 Claims, 14 Drawing Figures

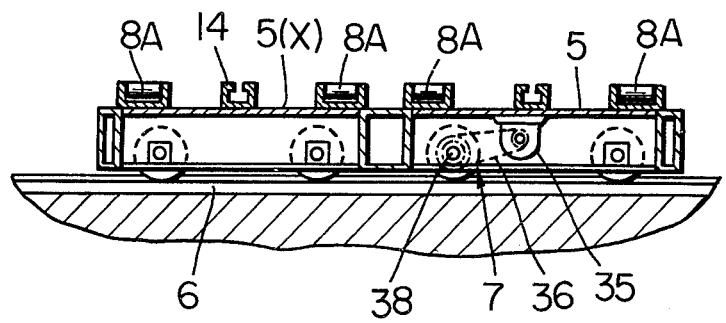
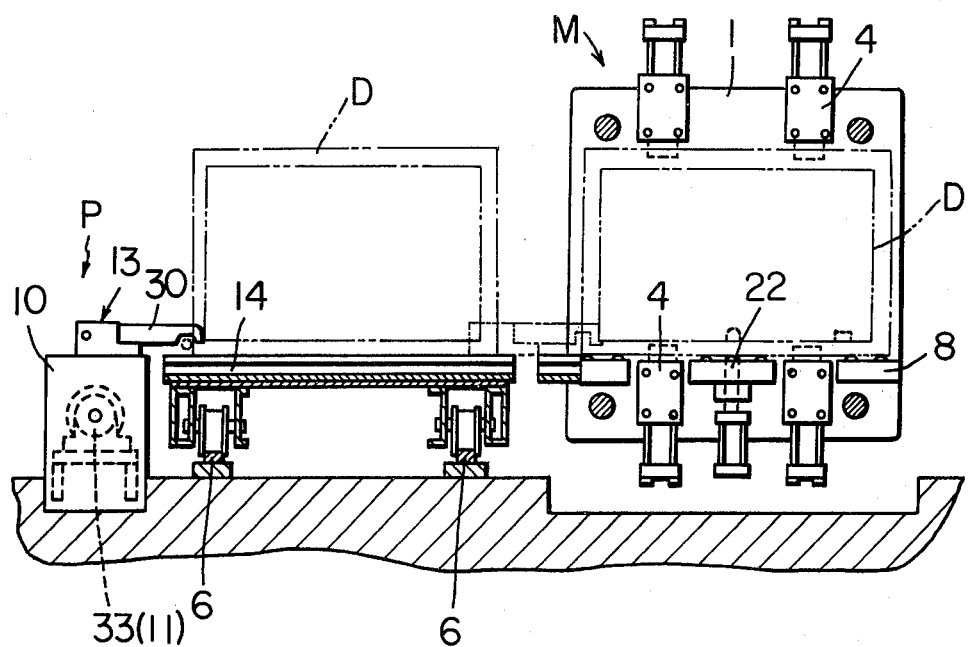

DIES EXCHANGING DEVICE FOR A MACHINE USING DIES

BACKGROUND OF THE INVENTION

The present invention relates to a dies exchanging device for machines using dies such as vertical presses, horizontal injection molding machines or die-casting machines. However, this device is applicable as a work-pallet exchanging device for machine tools.

As typical examples of conventional dies exchanging devices for such machines using dies are known "press dies transfer device" as shown in FIGS. 13 and 14.

This press die transfer device consists in that a pair of carriage cars 205 are movable in front of the press, two die mounting sections are provided on the carriage car 205, a push-pull device P1 is provided in front of die mounting sections and on one side of each carriage car 205, a chain 212 driven by a sprocket 223 of a driving means is guided along a guide groove in a guide member 214 of the carriage car 205 so restrained lest it should bend and a push-pull hook means 213 connected to the forward end of the chain 212 is used to advance or retract dies D1 for exchanging thereof.

In this device the push-pull device P1 is provided for each of the two carriage cars 205, and only one unit of the push-pull device is operative as the dies are exchanged, the other unit of the device is always kept idle.

Moreover, since the whole push-pull device is incorporated in the carriage car 205, the construction of the carriage car 205 is complicated, its weight is increased and the travelling gear becomes bulky.

SUMMARY OF THE INVENTION

The present invention is aimed at simplifying the construction of the dies exchanging device as a whole, simultaneous weight-saving and also lowering of the design and manufacture costs through halving of the number of required main units of push-pull device by detaching the main unit of the push-pull device from the dies carriage car and place it in front of the die mounting space between the stationary plate and the movable plate beyond the carriage car The present invention presents a dies exchanging device for a machine using dies for exchanging a pair of dies clamped to a stationary plate and a movable plate thereof comprising a first roller transfer means, carriage cars and a push-pull device, wherein the first roller transfer means for transferring a pair of dies longitudinally is provided on a stationary plate and a movable plate in the lower part of a die mounting space between the stationary plate and the movable plate;

the carriage cars, at least a pair thereof, are laterally movable in front of the machine and are adapted to be able to stop in front of the die mounting space, and each carriage car is provided with a second roller transfer means on the top thereof;

the push-pull device comprises a main unit independent of the carriage car placed on the floor in front the die mounting space across the carriage car, a drive means in the main unit, a bendable driving band adapted to be driven forward or backward by the drive means between the main unit and the carriage car, a guide means provided on each carriage car for guiding the driving band reatraining its bending and a push-pull hook means connected to the forward end of the driving band and is engageable detachably with the mating member of the dies; and the dies are exchangeable between the die mounting space and either of the carriage cars which is stopped in front of the die mounting space, with the push-pull device and the first roller transfer means and the second roller transfer means, by means of engaging the push-pull hook means with the mating member and guiding the driving band with the guide means.

According to the present invention, the main unit of the push-pull device is detached from each carriage car and placed in front of the dies mounting place across the carriage car, hence asingle unit of the push-pull device can serve to shift the dies in the dies mounting space to either carriage car as well as to shift a new set of dies on the other carriage car to the dies mounting space. That is, one main unit of push-pull device can serve two carriage cars, hence the required number of units of push-pull device can be halved. Meanwhile, the carriage car can be made lighter by the weight of the detached push-pull device, hence the travelling gear can be made much smaller or more compact. Further, marked simplification is then possible with regard to the construction of the mechanism linking the carriage car and the push-pull device, hence the carriage car can be made much simpler in construction and lighter, and standardization becomes easier for the design and manufacture of the main unit of push-pull device as well as the carriage car, this enabling mass production of the dies exchanging device at a reduced cost.

In a further preferred embodiment of the present invention, a steel chain is used as the above-mentioned driving band and the aforesaid drive means comprises a sprocket, a bearing block carrying the sprocket pivoted thereon, screw shaft for driving up and down the bearing block and the electric motor driving the screw shaft clockwise and counterclockwise.

In this way, the components involved can be built in the main unit neatly and compactly.

In addition to the above modification, inverted U-sectioned members are attached to the outside of the steel chain, which does not mesh with the sprocket, corresponding to the individual link plates of the chain, such that each pair of inverted U-shaped end faces of the members adjacent each other is in contact so that the steel chain can be bent only inward to mesh with the sprocket and also that a tunnel-like path for a hydraulic hose is provided between the inverted U-sectioned members and the steel chain, and the hydraulic hose is interlocked through the path, and the push-pull hook means is provided with a hydraulic cylinder for changing positions of a hooking arm of the push-pull hook means.

This arrangement not only enables remote controlling the hooking arm into or out of engagement with the mating part of the die but also enables detection of the position of the hooking arm, by the cable laid along the above-mentioned hydraulic hose.

BRIEF DESCRIPTION OF THE DRAWINGS

FIGS. 1 through 11 show embodiments of the present invention and FIGS. 13 and 14 show the prior art.

FIG. 1 is a perspective view showing a horizontal injection molding machine and its dies exchanging device.

FIG. 2 is a plan view corresponding to FIG. 1.

FIG. 3 is a sectional view taken along line III—III in FIG. 2.

FIG. 4 is another sectional view taken along line IV—IV in FIG. 2.

FIG. 5 is an enlarged side view in vertical section of a push-pull device and a part of a carriage car.

FIG. 6 is an enlarged front view in vertical section of a guide means.

FIG. 7 is a fragmentary plan view of a modified driving band.

FIG. 8 is an enlarged front view in vertical section of the guide means for the driving band shown in FIG. 7.

FIG. 9 is a side view in vertical section of the push-pull device in another embodiment.

FIG. 10 is a sectional view taken along line X—X in FIG. 9.

FIG. 11 is another sectional view taken along line XI—XI in FIG. 10.

FIG. 13 is a plan view showing the prior art, and

FIG. 14 is a sectional view taken along line XIV—XIV in FIG. 13.

DETAILED DESCRIPTION OF THE INVENTION

Figure 1:
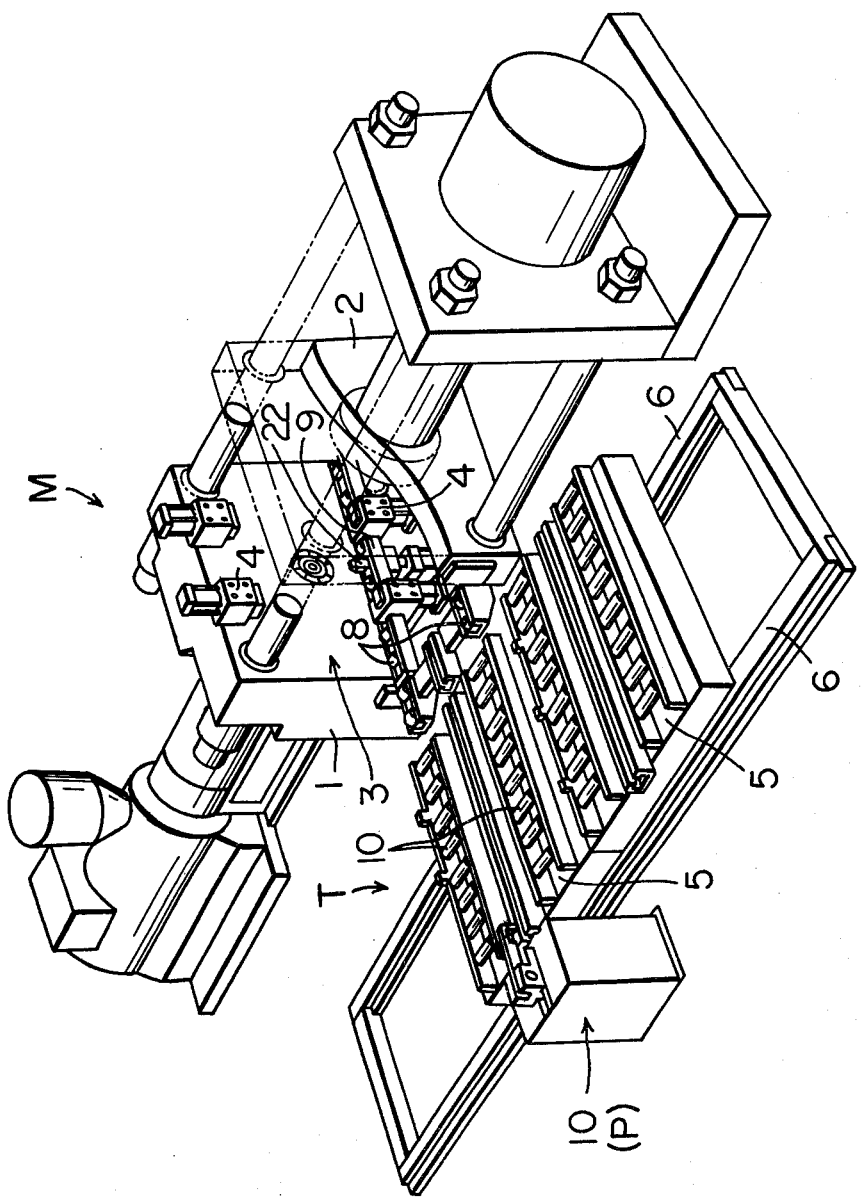
Figure 2:
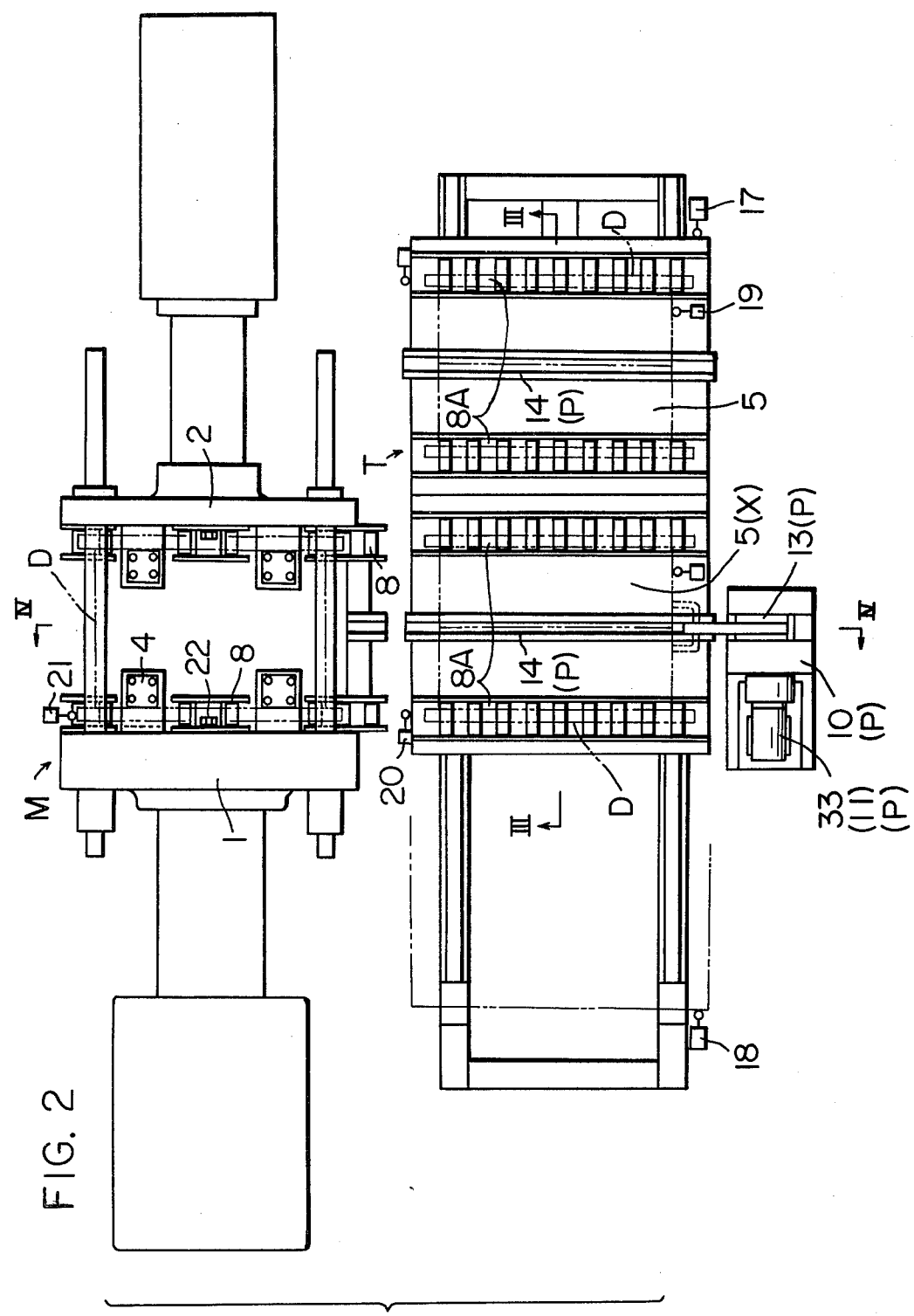

As shown in FIG. 1, a horizontal injection molding machine M is provided with a dies exchanging device T for exchanging a lateral pair of dies D clamped to a stationary plate 1 and a movable plate 2 thereof respectively.

The pair of dies D disposed in the die mounting space 3 between the stationary plate 1 and the movable plate 2 are clamped to these plates 1 and 2 respectively by means of hydraulic clamp 4.

In front of the injection molding machine M a pair of carriage cars 5 are arranged to run on rails 6 laid laterally driven by a driving device 7 so that either of the carriage cars is moved to a dies exchanging position X.

Under the die mounting space 3 of the injection molding machine M there are provided a pair of transfer roller devices 8 fixed to the stationary plate 1 and the movable plate 2 respectively, and there is also provided a centering device 9 whose pin 22 centers the pair of dies D.

On top of each carriage car 5 there are provided a pair of longitudinal sets of transfer rollers 8A, which can carry thereon the pair of dies D.

As seen from FIGS. 1 through 6, it is possible to move the pair of dies D longitudinally by means of a push-pull device P from the carriage car 5 stationed at the dies exchanging position X onto the transfer roller devices 8 or vice versa.

The main unit 10 of the push-pull device P is fixed on the floor in front of the dies exchanging position X apart from the carriage cars 5 so that it can serve both of the carriage cars 5.

The push-pull device P comprises the main unit 10, a drive means 11, a driving band 12 which is set in longitudinal push-pull motion by a sprocket 23 of the drive means 11, a push-pull hook means 13 connected to the forward end of the driving band 12 and a guide member 14 fixedly placed on the carriage car 5.

Figure 5:
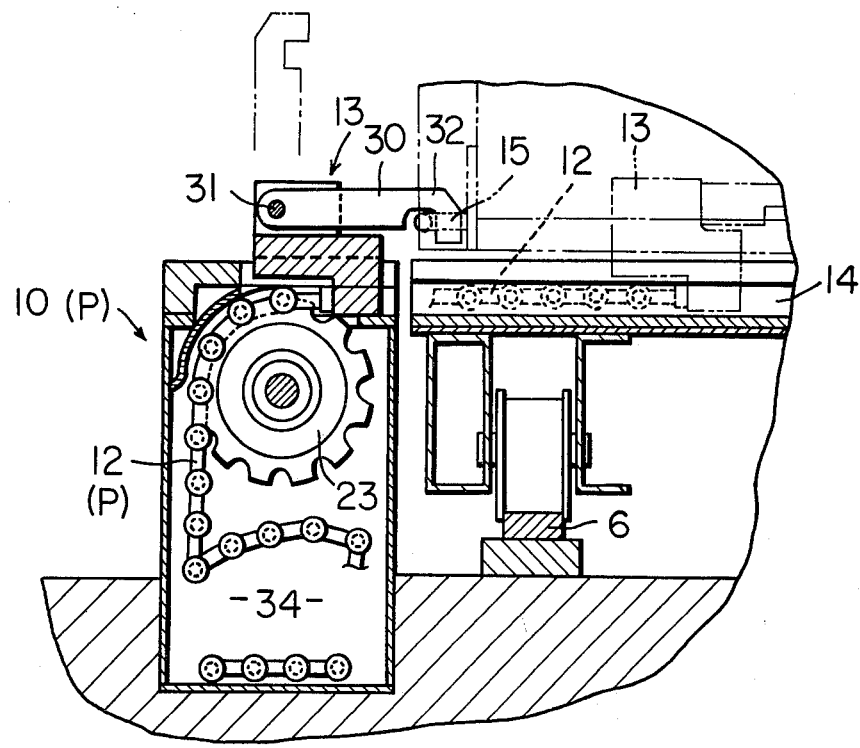
Figure 6:
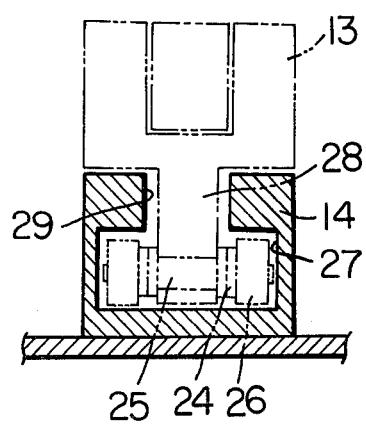

The driving band 12 is a chain made of steel whose pins 25 connecting link plates 24 are provided with idle wheels 26 at both ends thereof. Since these idle wheels 26 are guided by guide grooves 27 of the guide member 14 and restrained from lifting thereby, it is so adpated that, when this driving band 12 is driven forward or backward, the push-pull hook means 13 is set in longitudinal push-pull motion along the guide member 14 for either pulling or pushing the pair of dies D (FIGS. 5 and 6).

The leg portion 28 of the push-pull hook means 13 is guided in a longitudinal groove 29 of the guide member 14 for the driving band 12. A hooking arm 30 of the push-pull hook means 13 is pivoted on a pin 31 so as to be freely pivotable manually for its forward hook portion 32 to engage with or disengage from a mating means 15 of the die D.

The main unit 10 of the push-pull device P is box-shaped and in the upper portion therein there is provided a sprocket 23 meshing with the driving band 12, which is driven forward or reverse by the electric geared motor 33 disposed outside the main unit 10 but this motor 33 can be replaced with a pneumatic motor. Under the sprocket 23 in the main unit 10 there is provided a driving band accommodating room 34.

The driving device 7 is in common for the two carriage cars 5, and it is so adapted that the pair of carriage cars 5 are driven on the rails 6 leftward or rightward as an axle 38 is driven forward or reverse by a geared motor 35 disposed under the left carriage car 5 via a loop of chain 36.

There are also provided limit switches 17, 18, 19, 20, 21 for detecting the positions of the carriage cars 5 and the dies D.

Instead of the driving devices 7, the pair of carriage cars 5 may as well be driven by an electric motor mounted on one of the carriage cars 5 adapted to drive a pinion in mesh with a rack laid on the floor.

The connected pair of carriage cars 5 may as well be separated as two independent carriage cars.

Further, the transfer roller devices 8 provided on the stationary plate 1 and the movable plate 2 of the injection molding machine M can be replaced with a plurality of independent transfer rollers attached to the stationary and movable plates 1 and 2 at given intervals.

Figure 7:
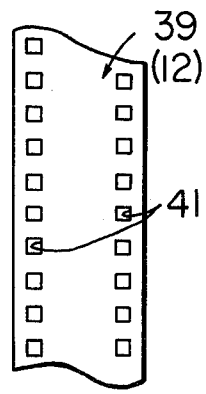
Figure 8:
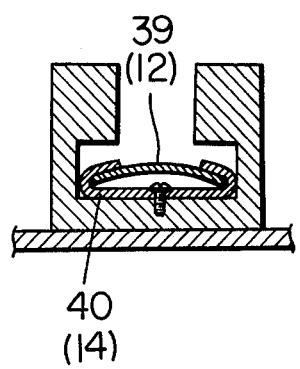
Figure 9:
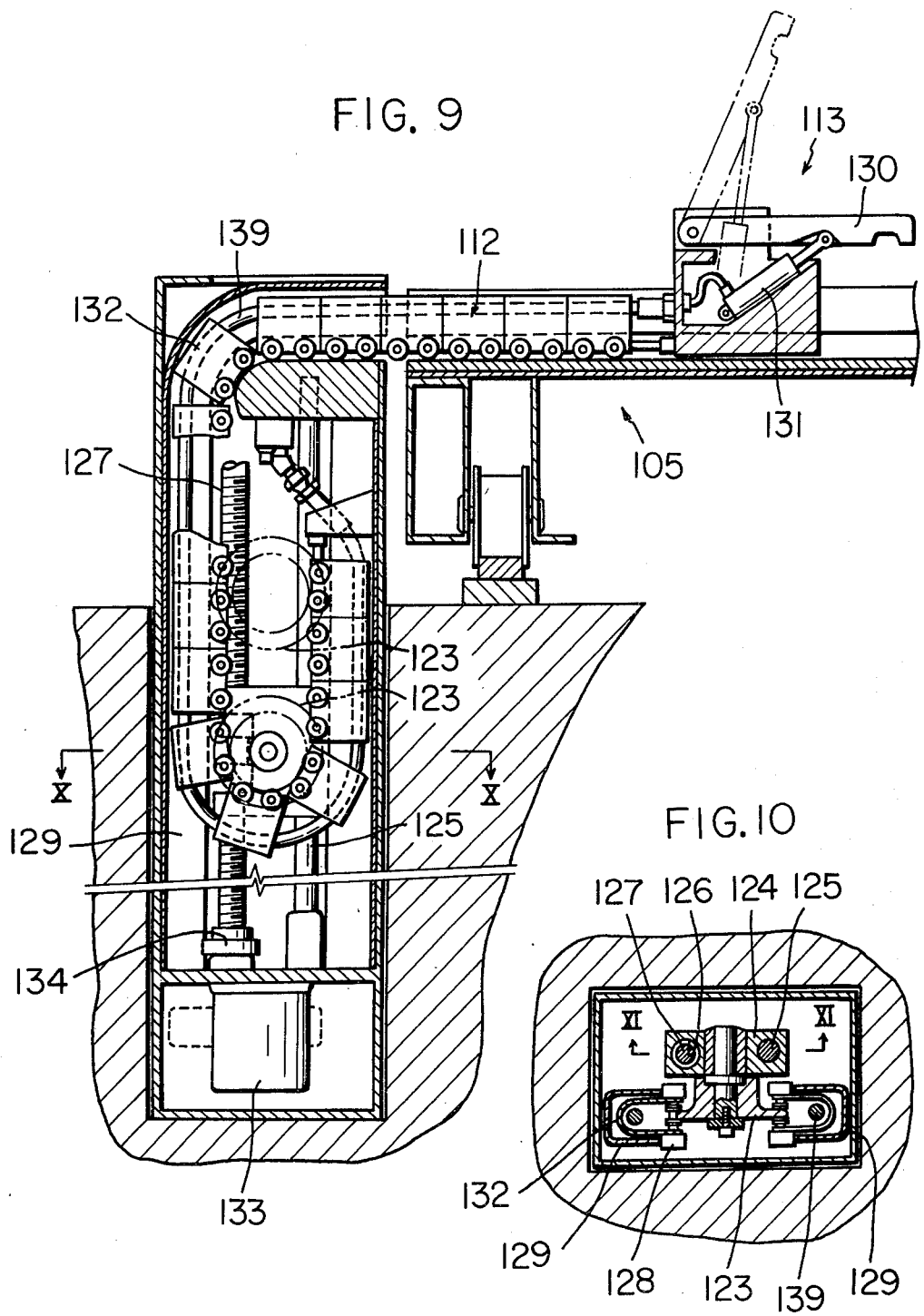
Figure 10:
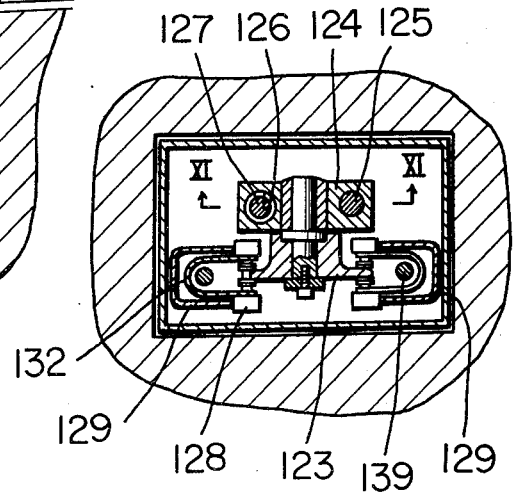
Figure 11:
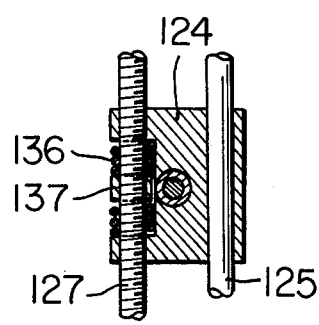

Furthermore, instead of the driving band 12 consisting of a steel chain, a steel strip 39 curved in cross-section as shown in FIGS. 7 and 8 may as well be used, this steel strip 39 guided and also restrained by a channel 40 in the guide member 14 for keeping the strip 39 curved so that the steel chain 39 would not be buckled as it is driven for pushing. The steel strip 39 may be perforated along both side edges thereof like a photo film with these perforations 41 in mesh with the drive sprocket.

Another embodiment of the push-pull device of the present invention is described below with reference to FIGS. 9 through 12.

This push-pull device P has a hooking arm 130 of its push-pull hook means 113, which is pivotable by a hydraulic cylinder 131.

A sprocket 123 for driving a drive chain 112 is pivoted on a bearing block 124, which is slidable along a guide bar 125 penetrated through the bearing block 124, and this bearing block 124 is driven up and down by a screw shaft 127 which is screwed into a tapped hole 126. The screw shaft 127 is adapted to be driven by an electric motor 133 via an reducing gear 134 clockwise or counterclockwise so that the bearing block 124 is lifted or lowered and thus the chain 112 in mesh with the sprocket 123 is caused to move forward or backward in the guide groove of a carriage car 105.

Idle wheels 128 of the drive chain 112 are guided by guide means 129 lest they should bend outwardly. In order to prevent them to bend inwardly as well and also to enable setting a hydraulic hose 139 for supplying hydraulic pressure to the hydraulic cylinder 131 for pivoting into or out of engagement the hooking arm 130 of the push-pull hook means 113, it is arranged as follows.

Inverted U-sectioned members 132 substantially identical in length with the link plate of the drive chain 112 are attached to the outside of the drive chain 112, i.e. the side not meshing with the sprocket 123, corresponding to the individual link plates of the chain, such that each pair of U-shaped end faces of the U-sectioned members adjacent each other is in contact so that the drive chain 112 can be bent only inward to mesh with the sprocket 123 and also that a tunnel-like path 135 for the hydraulic hose 139 is provided between the inverted U-sectioned members 132 and the drive chain 112, and the hydraulic hose 139 is set through the path 135 with its beginning end connected to a hydraulic pump (not shown) and its last end connected to the hydraulic cylinder 131.

It is also possible to have limit switches (not shown) for detecting the pivotal positions in and out of engagement of the hooking arm 130 attached to the push-pull hook means 113 and the cables leading thereto and therefrom set through the path 135 like the hydraulic hose 139 so as to see whether the hook arm 130 is in engagement or not.

There are also provided a spring 136 for preventing overloading of the electric motor 133 and a nut 137 on the screw shaft 127.

Figure 12:
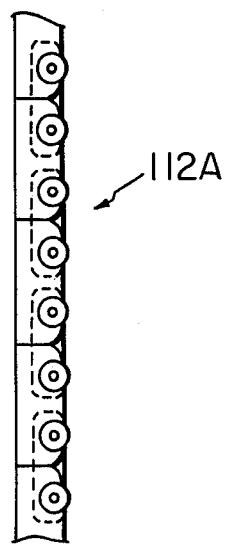
FIG. 12 is a fragmentary side view of a modified driving band for the push-pull device in another embodiment.
Figure 13:
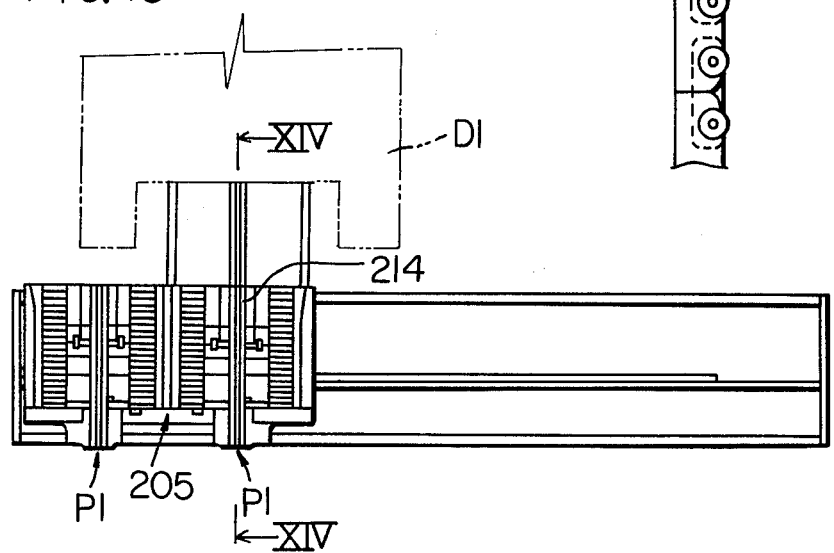
Figure 14:
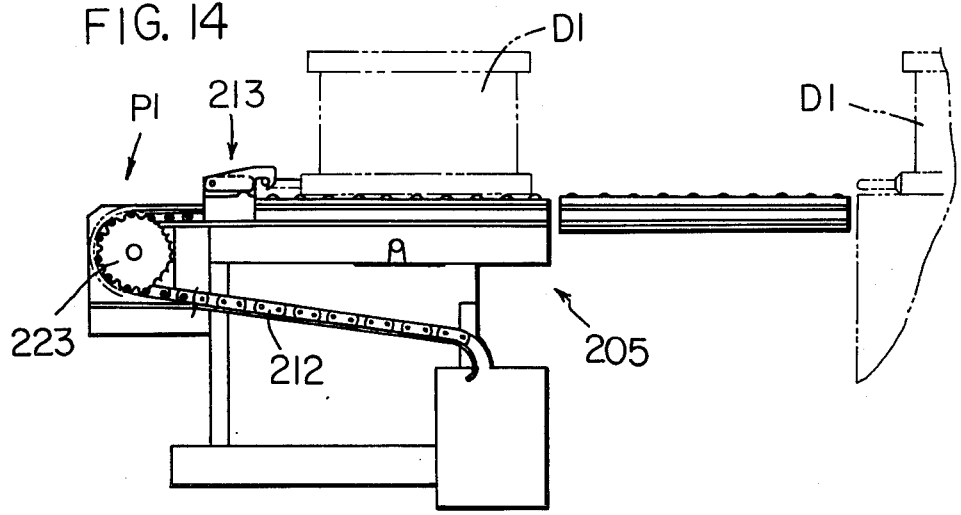

In case the above-mentioned path 135 is not required, it is also possible to use as driving band a steel chain 112A bendable only on the sprocket 123 side as shown in FIG. 12.

What is claimed is:

1. A dies exchanging device for a machine using dies for exchanging a pair of dies clamped to a stationary plate and a movable plate thereof comprising a first roller transfer means, carriage cars and a push-pull device, wherein:

said first roller transfer means for transferring a pair of dies longitudinally is provided on a stationary plate and a movable plate in the lower part of a die mounting space between said stationary plate and said movable plate;

said carriage cars, at least a pair thereof, are laterally movable in front of said machine and are adapted to be able to stop in front of said die mounting space, and each carriage car is provided with a second roller transfer means of the top thereof;

said push-pull device comprises a main unit independent of said carriage car placed on the floor in front said die mounting space across said carriage car, a drive means on said main unit, a bendable driving band adapted to be driven forward or backward by said drive means between said main unit and said carriage car, a guide means provided on each carriage car for guiding said driving band restraining its bending and a push-pull hook means connected to the forward end of said driving band and is engageable detachably with the mating member of said dies; and said dies are exchangeable between said die mounting space and either of said carriage cars which is stopped in front of said die mounting space, with said push-pull device and said first roller transfer means and said second roller transfer means, by means of engaging said push-pull hook means with said mating member and guiding said driving band with said guide means.

2. A dies exchanging device for a machine using dies as recited in claim 1, wherein said machine using dies is a horizontal injection molding machine.

3. A dies exchanging device for a machine using dies as recited in claim 1, wherein said machine using dies is a vertical press.

4. A dies exchanging device for a machine using dies as recited in claim 1, wherein said driving band of said push-pull device is a steel chain.

5. A dies exchanging device for a machine using dies as recited in claim 4, wherein said drive means comprises a sprocket disposed in the upper part of said main unit and an electric motor driving said sprocket.

6. A dies exchanging device for a machine using dies as recited in claim 4, wherein said drive means comprises a sprocket, a bearing block on which said sprocket is pivoted, a screw shaft for driving said bearing block up and down and an electric motor driving said screw shaft.

7. A dies exchanging device for a machine using dies as recited in claim 6, wherein inverted U-sectioned members are attached to the outside of said steel chain, which does not mesh with the sprocket, corresponding to the individual link plates of said chain, such that each pair of inverted U-shaped end faces of said members adjacent each other is in contact so that said steel chain can be bent only inward to mesh with said sprocket and also that a tunnel-like path for a hydraulic hose is provided between said inverted U-sectioned members and said steel chain, and said hydraulic hose is interlocked through said path, and said push-pull hook means is provided with a hydraulic cylinder for changing positions of a hooking arm of said push-pull hook means.

* * * * *